3,554,893
ELECTROLYTIC FURNACES HAVING MULTIPLE CELLS FORMED OF HORIZONTAL BIPOLAR CARBON ELECTRODES
Giuseppe de Varda, Milan, Italy, assignor of seventy percent to Montecatini Edison S.p.A., Milan, Italy
Filed Oct. 17, 1966, Ser. No. 587,243
Claims priority, application Italy, Oct. 21, 1965, 23,575/65
Int. Cl. C22d 3/02, B01k 3/04
U.S. Cl. 204—244                          17 Claims

ABSTRACT OF THE DISCLOSURE

Described is a fused bath electrolysis furnace for producing metals, of higher specific gravity than the bath, from their oxides. The furnace comprises a vat with a cathodic bottom, a carbon anode adapted to be lifted and lowered relative to said bottom, and at least one horizontal bipolar carbon electrode between said anode and cathode in vertically spaced relation thereto and having a cathodic top face for accumulating metal produced. Also described is the production of aluminum from alumina in a bath containing fluorine salts in such furnaces.

My invention relates to processes for the electrolytical production of aluminum, magnesium or other metals from their oxides dissolved in fused baths. The metal collects on the cathode of the electrolytic furnace. The oxygen combines with the anode of carbonaceous material to form gaseous compounds, such as $CO_2$ and $CO$, which evolve from the bath. So far, these processes have found industrial application only in horizontal monocell furnaces, i.e. having a cell in which the active, positive and the negative electrode surfaces are horizontal. Thus, for example, the whole world industry for electrolytic production of primary aluminum still uses only furnaces with pre-baked multiple anodes or self baking anodes, but always monocell furnaces characterized, besides other things, by a furnace terminal tension of the order of 4 to 5.5 volts and by amperages between 40,000 and 130,000 amps.

The cost of the metals thus produced is high, especially because of:

(1) The high cost of the single furnace as compared with its limited productive potentiality;

(2) The high kwh. unit consumption which both directly and indirectly influences the cost. Directly, since it is evident that one kg. of aluminum will cost less, if 12 instead of 16 kwh. are consumed in order to produce it. Indirectly, because usually the aluminum factories during certain months of the year can dispose only of allotted limit amounts of electric energy. If one of these factories produces only 300 tons/day of aluminum, whereas 400 could be produced with non-allotted energy, a further heavy burden on the cost will result due to the higher unit incidence of the general expenses.

(3) The high incidence of the costs, and therefore of the depreciation rates, of the expensive complementary electrical accessories for the furnaces, such as transformators, rectifiers, connecting bars. The cost of said accessories varies as a direct function of the kw's. of installed power, and of the amperages employed and, as a consequence, varies with kwh. unit consumption of the installed furnaces.

To eliminate or reduce these drawbacks and disadvantages, applicant has taken out a patent on a multiple-cell furnace having inclined or vertical bipolar electrodes, which appears particularly convenient if installed in completely new plants. The constructive and operative characteristics, especially the electrical characteristics (for instance 5,000 ampers in a 24-cell furnace having inclined bipolar electtrodes against 100,000 amperes of mono-cell furnaces, both having a potentiality (productive capacity) of 700 kg. of aluminum/day), when comparing these two types of furnace, differ in substantial measure. Thus in traditional factories, the substitution of multi-cell furnaces having inclined electrodes for the old mono-cell furnaces obviously encounters serious difficulties, due to the radical difference in the constructive and operating characteristics, such as floor plan, dimensions, materials of construction (specially refractory materials), rectifiers, bars.

An object of the present invention is to achieve the above-mentioned very advantageous results of the inclined-electrode multicell furnaces, without the need of substituting entirely or radically modifying existing traditional plants. By this invention, neither the furnace vat, nor its occupied area, nor the complementary (auxiliary) electrical plants for the furnace, nor the buildings which may already exist, etc., must substantially change.

The invention substitutes a particular system of horizontal, superposed but distanced, bipolar carbon electrodes, for the anodic carbon electrodes in the traditional monocell furnaces. The invention provides further a particular shape for the bipolar electrodes. The electrodes are in the form of a flat tray with turned-up borders, so as to collect the metal, produced by the electrolytic process, on their cathodic face and in contact with it. The concavity of the upper face of these "trays" fills with metal, during the electrolysis. The metal, further produced there, overflows from said trays and drops onto the surface of the subjacent tray or directly onto the bottom of the vat.

The invention also provides spacers suitable to keep separated the various bipolar electrodes from each other at a pre-established distance so that the upward thrust exerted upon them by the bath (the bath density being higher than that of the carbon) cannot cause the electrodes to pile up into direct contact with each other.

In this way, each coupled formed by the two contiguous bipolar electrodes constitutes (when in the space between them is filled with fused bath and traversed by continuous current) a real and true electrolysis cell.

A further object of the invention is to provide the spacers with particular shapes and materials whereby the spacers resist well the attack of the bath and of the molten metal and are not crossed, or only insignificantly crossed, by the electrolysis continuous current, and can be easily placed and removed.

Another object of the invention is to provide a process in which a pre-baked carbonaceous material, identical to that used for the conventional pre-baked anodes in traditional furnaces for aluminum production, can be used for the bipolar electrodes, without the necessity of having recourse (not even for the cathodic portion of the same electrodes) to graphite which is much more expensive than the pre-baked anodic carbon. In the process of the invention, the bipolar electrodes are practically completely consumed in the course of the electrolysis. This does not occur in traditional furnaces having multiple anodes, in which the remains of the anode are extracted from the furnace and substituted with a new anode.

Furthermore, the invention has as an object constructive and operative improvements made in the traditional monocell aluminum furnace having pre-baked anodes, so that the productivity of the furnace can be doubled or tripled without substantially modifying the furnace plan (i.e. the area occupied by it), while investing only from 20 to 40% more than the cost of the traditional furnace in the construction of the new furnace.

The invention has as an object the reduction of the unit consumption of kwh. by 15–25%, over the traditional monocell furnace for aluminum having pre-baked andoes, and achieving in certain cases a unit consumption less than 11–12 kwh. per kg. of aluminum produced.

Other objects and features of the present invention will appear from the following detailed description of the furnace having horizontal multiple cells, and the respective process, and the numerical example with reference to the accompanying drawings, which are given by way of example only, without intent to limit the scope of the invention.

Figure 1:
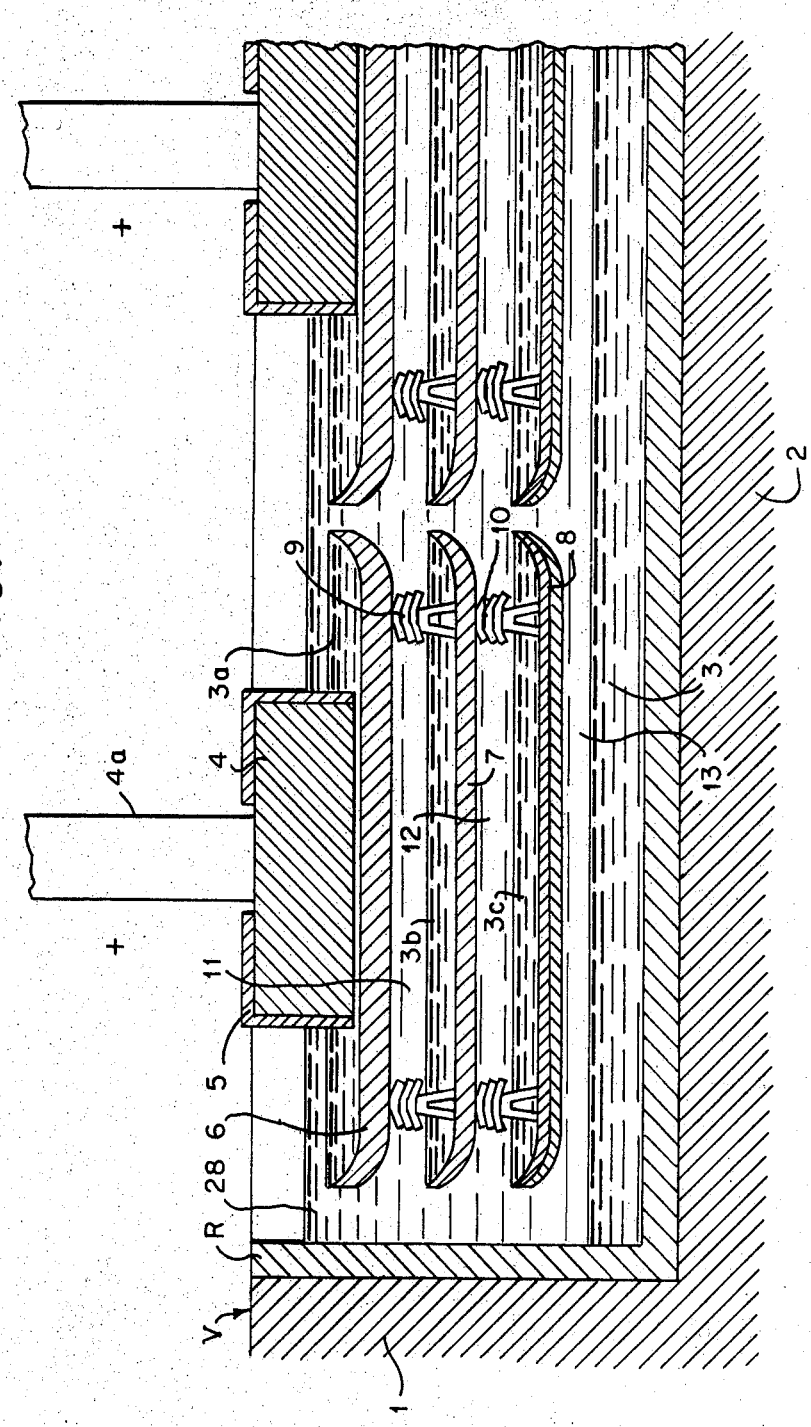
FIG. 1 represents part of a furnace having horizontal multiple cells according to the invention, in vertical section, according to path A—A of FIG. 6.

In FIGS. 1 to 7, equal references indicate equal or analogous parts.

With reference to the drawings, V indicates a traditional type of vat, having side walls 1 and bottom 2 made of carbon of refractory material. It is preferably made of silicon carbide bonded with silicon nitride, such as available in commerce under the name "Refrax." Said side walls, if of carbon, are lined with a refractory material R, e.g. Refrax, which does not conduct, or only slightly conducts, the electrical current. The layer of molten metal 3, covering the bottom of said vat, constitutes the terminal cathode. The terminal anode is a pre-baked carbon anode 4, metallically connected with current bars 4a and suitably insulated against corrosion, caused by atmospheric air combustion, by refractory envelope 5 or by a metal jacket. The terminal anode not only feeds electric current to the multicell furnace, but also keeps the set of the subjacent bipolar electrodes or "trays" (6, 7 and 8), consisting of carbonaceous material as usually employed for pre-baked anodes, submerged by opposing their upward thrust. It is understood that the tray shapes illustrated in the figures are not limitative, since obvious variants are possible.

The furnace of FIG. 1 is suitable for the electrolytical production of a metal from its oxide dissolved in a bath of lower density than the metal in question, e.g. aluminum. The molten metal, electrolytically produced from the bath occupying the space between two superposed bipolar electrodes, collects on the concave face of the lower bipolar electrode which functions as cathode. The corresponding convex face, subjacent to the concave face of the same bipolar electrode, instead, functions as an intermediate anode. This is, for example, the case in the electrolysis for the production of aluminum from alumina dissolved in a cryolitic fused bath. Usually the molten salt baths have a density higher than that of the carbonaceous materials of which the bipolar electrodes consist, thereby subjecting these electrodes to an upward thrust. Spacers are inserted between the electrodic trays, such as 9, 10, in general in a numeber of four or six for each tray, in order to oppose this thrust of the bath.

The current enters through the terminal anode 4, passes sequentially through the first layer of molten aluminum 3a, first tray 6, bath layer 11, the second layer of molten aluminum 3b, the second bipolar tray 7, the subsequent bath layer 12, the third layer of molten aluminum 3c, tray 8, bath 13, to the layer of molten aluminum 3 which covers the bottom of the traditional vat and functions as terminal cathode.

The spacers 9, 10 must be easily placeable and easily removable by the furnace operators. They must also resist the aggressive components of the bath and the molten aluminum and must not short-circuit, or only to a negligible extent, the electrolytic current. The electrolytic current must pass almost integrally from the upper tray to the immediately subjacent tray while crossing the layers of fused bath 11, 12, and the layers of molten metal 3b, 3c occupying the hollow space formed by the contiguous electrodic trays, two by two, respectively.

FIGS. 2, 3, 4, 4a, and 5 show some preferred variants of said spacers, which however do not in the least limit the contents of the present invention.

Figure 2:
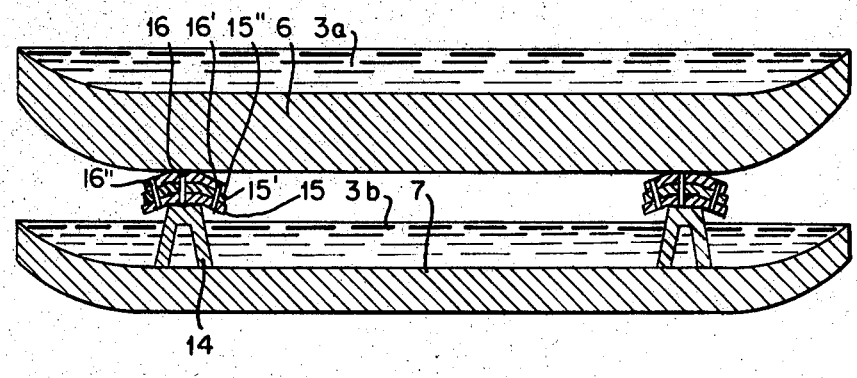
FIG. 2 shows, in vertical section and on larger scale than FIG. 1, two superposed bipolar electrodes with respective spacers.

In FIG. 2, the spacer consists of a carrying element 14 of electrically insulating refractory material, e.g. Refrax, which has a density of about 3 and therefore is heavier than both the bath and the metal; surmounted by one or more cap-shaped carbons 15, 15′, 15″, etc. The latter are preferably provided with holes, central holes 16 and/or peripheral holes 16′, 16″, which by discharging the gas bubbles upwards serve to avoid gas pockets. Thus they avoid direct contact of the trays with the spacers. They also prevent irregularity of electro-chemical consumptions of the anodic carbon in that zone by evenly partaking of the electrolysis process. It is preferable that the refractory element 14 extend above the molten metal layer so that the carbon element 15 shall not touch the subjacent molten metal layer 3b, 3c, etc. The perforated carbon cap 15 or caps 15, 15′, 15″, etc., situated above said element 14, permit a regular stoichiometric consumption of the anodic face of the superjacent tray, which combines with the oxygen freed from the metal oxide by the electrolysis, while simultaneously preventing or minimizing the passage of parasitic currents (vagabond currents) through the spacer.

As disclosed in Italian Pat. No. 529,218, the current passage through a thin bath layer, such as exists for instance between cap 15 and cap 15′, etc., gives rise to a drop of ohm tension, without electrolysis, of 0.2 volt for a density of 0.5 a. per cm.$^2$. This drop increases, however, very rapidly if the current density on the contact surfaces rises for instance to 1 a./cm.$^2$. Thus the spacer, the two ends whereof are at a difference of potential of a few volts, will be crossed only by a minimum current, both because of the insulation caused by the refractory element 14, and because of the various contact layers of carbon and liquid bath formed by the cap-shaped elements.

Figure 3:
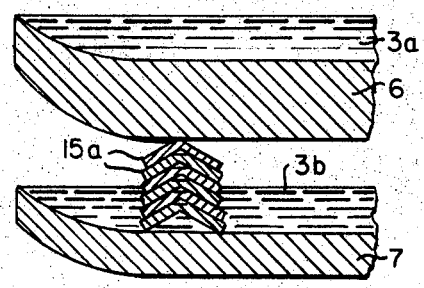
FIGS. 3 and 4 show variants of spacers in representation analogous to that of FIG. 2.
Figure 4:
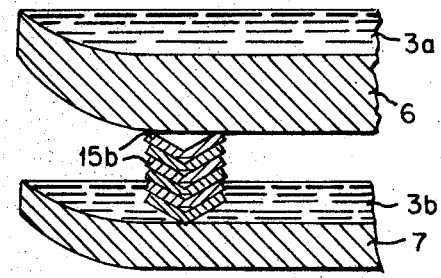
Figure 4A:
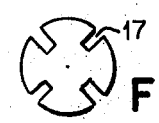
FIG. 4a shows the spacer of FIG. 4, in plan view.

In FIG. 3 the spacer consists exclusively of caps 15a, made of graphite or of pre-baked carbonaceous material in the form of cones with their base turned downwards, whereas in FIG. 4 the spacer consists of reversed caps or funnels 15b, made of graphite or of pre-baked carbonaceous materials (cones with their base turned upwards). The elements 15b are preferably provided with notches 17 (FIG. 4a) having a function analogous to holes 16, 16′, 16″ of FIG. 2, i.e. of facilitating the exchange of the bath in the zone above the spacer, in order to avoid consumption irregularities of the electrodic carbon in that zone.

Figure 5:
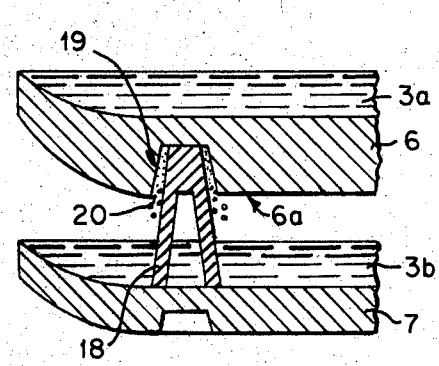
FIG. 5 is the vertical section of another variant of spacer.

Spacer 18, illustrated in FIG. 5, has the shape of a truncated cone, similar to that of element 14 of the spacer illustrated in FIG. 2, made of electrically insulating refractory material. This spacer engages in a corresponding recess 19 seen on anodic face 6a of the superjacent bipolar electrode (tray) 6. The recess is designed to collect the electrolysis gas 20 which displaces the bath therein. Thus electrolysis stops in the recess. The spacer is protected by means of said gas from the bath attack in anodic zone. Thus also, the spacer is prevented from progressively penetrating into the anodic zone of the superjacent electrodic tray. Consequently no electrochemical consumption of the carbon takes place.

The operation of the furnace (FIG. 1) will be described with particular regard to the replacement of the bipolar electrodes. The tapping of the produced metal will not be described, since this operation is performed by methods known per se.

During operation, the carbon electrode 4, acting as terminal anode, is partially immersed in the fused bath 28 and in a molten metal layer 3a which assures a perfect electrical contact between electrode 4 and tray 6. As previously stated, the terminal anode also counters the upward thrust of the subjacent electronic trays submerged in the bath. After a period of time, trays 6, 7 and 8 grow thinner since their (convex) anodic surfaces are electrolytically "burnt" by the oxygen produced by the electrolytic reaction caused through the continuous passage of electrical current. While the distances between trays 6 and 7, and between 7 and 8, remain practically unchanged, or tend, if at all, to contract, the distance between 8 and the metal layer 3 covering the bottom 2 of the vat tends to increase. This distance can be brought back to its original value by lowering, by means of methods known per se, the anodic device and consequently the current-carrying bar 4a and the terminal anode 4.

When the trays will have grown thin to a minimum value, which has been predetermined on the basis of mechanical and cost considerations, it is necessary to perform the anodic integration. The superficial bath incrustation which may have formed between terminal anode 4 and vat side wall is first broken. Then by means of suitable tools, e.g. L-irons, the tray 8 must be pressed downwards a few centimeters until, by means of suitable pliers, at least the portion of refractory material of the spacers (10) of said tray will have been brought to the surface. When the spacers are heavier than the bath, instead of removing them with pliers, they can be simply slid over the border of the tray and made to fall onto the bottom of the vat.

If the spacers consist only of carbonaceous elements (FIGS. 3, 4), it will be sufficient to slide a curved iron under the superjacent tray, in order to bring the spacers to the surface. This occurs because the specific weight of the spacers is lower than that of the bath and therefore no longer blocked by the upward thrust of the subjacent tray.

Having thus eliminated the spacers, the subjacent tray which still contains molten metal rises until it intimately adheres to the overlying tray, even if through a thin layer of molten metal. The metal excess which is displaced, precipitates onto the bottom of the vat. The combination of those two trays forms a new tray 8 (FIG. 1).

At this point, the terminal anode 4 is raised, thus allowing the pile of subjacent trays (6, and 7 integrated with 8) to freely rise so that the tray 6 protrudes from the bath because of the hydrostatic upward thrust especially on tray 7 integrated with 8. The counter-thrust by anode 4 which is now in lifted position is no more available. The weight of that portion of tray 6 now floating above the bath, and the weight of metal 3a contained therein, supplies the counter-thrust. The furnace personnel places rapidly spacers, either recovered or new, on floating tray 6. Then a new carbon tray, if possible preheated, is arranged, for instance by means of a crane, on said spacers. The terminal anode is now lowered until it touches the concave face of the new tray, just placed in the furnace, into which it will be advisable to charge metal scraps or liquid metal having the same quality as that produced in the furnace. Thereafter the terminal anode is lowered by means of the anodic device (not shown in the drawings since the same is known per se) thus exerting a thrust downwards on the new electrode until it is completely submerged in the bath. At this point, the electrodic tray 6 has passed a position 7, and the previous tray 7, now integrated with 8, to position 8, while the new electrode, in direct contact with the terminal anode 4, has now taken the position formerly occupied by tray 6. Thus the electrorlysis cycle starts again.

The disposition of the furnace and the mode of operating it, resolve many inconveniences of the commonly used traditional and known furnaces. In fact, it had not been possible to consume almost completely pre-baked anodes but only Soederberg anodes. Furthermore, the pre-baked anodic carbons are not suitable to function as "bare" cathodes (not covered by molten aluminum) unless one uses a current density much lower than 0.5 a. per cm.$^2$ or utilizes other expedients. To this effect, the new furnace can be operated with cathodic current densities above 0.5 amp per cm.$^2$, the cathodic face of the carbon trays being practically covered completely by molten metal.

It has already been stated that the cost of the weight unit of metal produced is much lower than in traditional furnaces. Furthermore, the productive capacities which can be reached with this furnace are by far higher than those achieved up to now in traditional furnaces, without exceeding 50,000 a. and therefore without having the rather considerable inconveniences caused by too high amperages, e.g. between 120,000 and 150,000 a., in the corresponding traditional furnaces, e.g. intense magnetic fields causing operative unbalances, strong stress of the carbonaceous cathodic bottom of the vat, etc.

Figure 6:
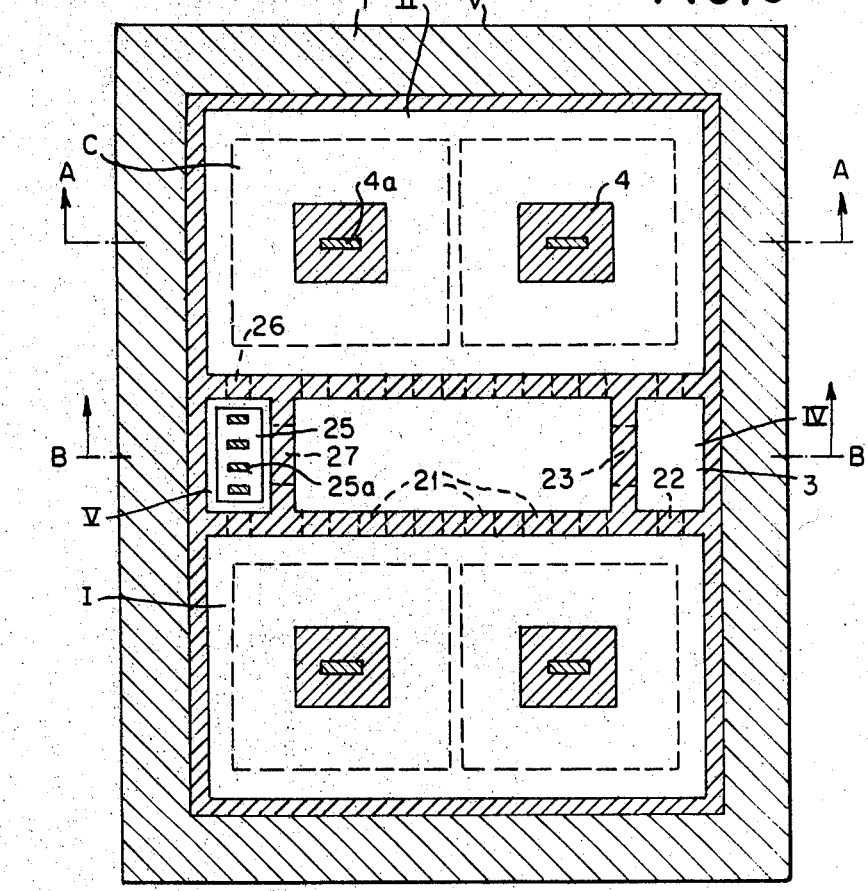
FIGS. 6 and 7 represent, the first in plan view and the second in vertical section (path B—B), a furnace having horizontal multiple cells according to the invention, particularly suitable for the electrolytic production of aluminum from aluminum oxide in fused bath.
Figure 7:
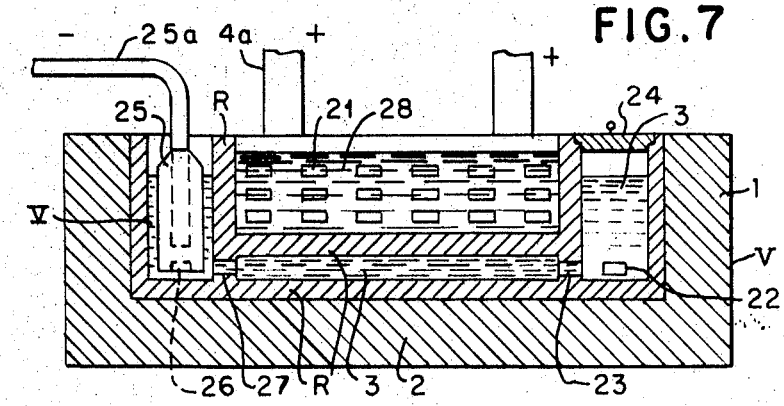

FIGS. 6 and 7 respectively show a plan view and a vertical section of a multiple horizontal cell furnace which is particularly suitable for electrolytic production of aluminum. In FIGS. 6 and 7, the external walls 1 of the vat and the bottom 2 of the vat are constructed of traditional material. The furnace is divided by walls made of refractory material, which does not conduct electrical energy, into five compartments, for instance I, II, III, IV and V. Of these compartments, the two larger ones, I and II, are identical with each other and are essentially occupied by cells C for electrolytic production of aluminum from fused bath. In these two chambers are the anodic current-carrying bars 4a, the four terminal anodes 4, the fused salt bath filling these compartments, molten aluminum under each of the four terminal anodes, and four sets of three trays each of carbonaceous material, lying one above the other and separated by spacers, as amplified in FIGS. 1 to 5. During operation, the four bars for feeding the anodic current are connected to a traditional anodic device used in traditional furnaces, and thus are connected in parallel, whereby they are under approximately the same electrical potential.

The central compartment III of the furnace consists of the alumina-feeding chamber which is in the middle of the large furnace vat and is entirely lined with refractory material non-conductive of electrical current (e.g. Refrax). This chamber III is in contact with the large electrolysis chambers I and II by numerous holes 21 made in the longitudinal wall. The bottom of chamber III for alumina also consists of insulating refractory material (e.g. Refrax). The alumina needed for electrolytic production of aluminum in this multicell furnace is fed into chamber III which, because of its interconnection with electrolysis chambers I and II, is full of fused bath but not of metal. The alumina is fed from the top by conventional methods, either intermittently, or breaking periodically the crust which forms on the surface of the solid bath, or feeding the alumina by means of a continuous feeding device as described in U.S. Pats. Nos. 2,713,024 and 3,186,927, or any other conventional method. If the alumina fed into chamber III quantitatively exceeds the alumina which, when dissolved in the bath, spreads through holes 21 into bath 28 of the electrolytic compartments I and II and then into the hollow spaces between tray and tray, a layer of non-dissolved alumina will form on the bottom of the alumina chamber. In this case, the feeding of alumina into chamber III is suspended or reduced so that the non-dissolved layer will be reduced or even disappear.

The fourth compartment IV constitutes, in the furnace according to the present invention, the vat chamber of the electrolytically produced aluminum. This chamber is filled with metallic auminum 3. The aluminum produced in the various cells or directly on the bottom, passing through holes 22 and 23, passes from the electrolysis chamber either directly into the tapping chamber through holes 22, or from the electrolysis chambers through the alumina chamber III, and then enters the tapping chamber IV (through hole 23). The aluminum in the tapping chamber is at a lower level than the level of the bath in the electrolysis chamber, and thereof in the alumina chamber, since the liquid layers, being almost in equilibrium, adjust themselves to each other according to the principle of communicating containers. The level of the molten aluminum in the tapping chamber, since aluminum has a specific weight by about 10% higher than that of the bath, consequently remains below the bath level in the chambers occupied by said bath. The tapping chamber is suitably closed on the top by a cover 24 which can be easily removed and replaced.

The fifth and last compartment V is constituted by the chamber of the terminal cathode 25. The cathodic metal conductors 25a extend from this cathode which constitutes the negative terminal of the furnace. The cathodic chamber, in turn, is respectively in contact, through holes 26 and 27, with the aluminum covering the vat bottom in the two electrolytic compartments, and with the aluminum beneath the alumina chamber. The carbon electrode 25 is immersed in this cathodic aluminum to ensure a good electrical contact. In other embodiments, the bottom of the alumina chamber rests directly on the bottom of the main vat.

The feeding of alumina into the alumina chamber and the removal (tapping) of the aluminum produced in the furnace are carried out by methods known per se and do not present features of particular difficulty. The operative parameters of the alumina feeding chambers, of the tapping and of the terminal cathode do not present particular inventive characteristics. The constructive and functional combination of these three chambers is, however, new and surprising, particularly if inserted into the general frame of the multicell furnace having horizontal bipolar electrodes.

NUMERICAL EXAMPLE

The following example is merely explanatory and not limitative for the present invention. This example refers to a furnace having an embodiment similar to that shown in FIGS. 6 and 7, except that instead of a tapping chamber and a terminal cathode as illustrated, the furnace to which the example refers, has two chambers, each having two terminal cathodic blocks, and which function as tapping chambers as explained hereinafter.

26,500 amperes of continuous current are fed to a multiple horizontal cell furnace. The furnace vat is provided with two large electrolysis chambers. Their bottoms have a total area equal to 53,000 cm.$^2$ and are covered with a layer of molten aluminum (cathode), above which is molten cryolite bath. In the center of the vat there is also a chamber for alumina feeding, filled only with bath and intercommunicating with the afore-mentioned two large electrolysis chambers by means of multiple holes made in the interposed side walls. At the two ends of said alumina feeding chamber there are two smaller chambers, one at each end, containing only molten aluminum. These chambers communicate with the bottom aluminum layer of the two contiguous large electrolysis chambers through holes made near the bottom of their walls. Two pairs of carbon blocks each having a section of $50 \times 30$ cm. are partially immersed in the molten aluminum, which is present in each of the two smaller chambers. The four blocks, therefore, function as terminal cathodes and are electrically connected to the cathodic current bars. The walls and the bottoms of the above-mentioned five chambers are lined with refractory materials, based on silicon carbide bonded with silicon nitride, which constitutes a fairly good electric insulator and resists well the electrolytic bath as well as the molten aluminum. Two practically identical electrode groups, all made of pre-baked carbon, are immersed in the bath present in both the two large side chambers of the furnace. There is a total of 4 electrode groups in the furnace. Each electrodic group, connected electrically in parallel to the electrical circuit of the furnace, is formed of a terminal anodic block, electrically connected with the anodic current bars, and is partially immersed in the bath. Beneath said anodic block there is, in horizontal position, an electrodic tray (shaped in a similar way as illustrated in FIG. 1) containing molten aluminum. The electrical contact between anodic block and electrodic tray is by means of an interposed thin layer of molten aluminum. Underneath the aforementioned electrodic tray there is, also in horizontal position and at a distance of about 5 cm., another electrodic tray of similar shape which constitutes the bipolar intermediate electrode in each of the four electrode groups. This last tray is also filled with a layer of molten aluminum having a thickness of about 2.5–3 cm. The interpolar distance of about 5 cm. is constantly maintained by four Refrax spacers, as shown in FIG. 5. The distance between this last bipolar electrode and the layer of molten aluminum present on the non-conductor bottom of the vat, is about 4.5–5 cm.

The anodic surface area of each electrodic tray is about 1 m.$^2$. The initial thickness of the upper tray, in contact with the anodic block, is about 8 cm. The initial thickness of the subjacent bipolar tray, after the first anodic integration of two trays each having 4 cm. thickness, also amounts to 8 cm. The initial thickness of each electrodic tray decreases, due to the electrolytic consumption of the anodic surface, at the rate of 4 cm. in the course of 4 days. Thereafter the anodic integration operation takes place.

This is carried out as follows. The superficial bath crust is first broken away. Two men with iron bars push the intermediate tray downwards, while a third man with an implement tries to hook and to recover, one at a time, the four spacers which are still on the thus lowered tray. Until the personnel is sufficiently trained in this operation, the recovery of the Refrax spacers will not always succeed and the Refrax spacers may fall down to the vat bottom. This is a minor inconvenience since the spacers dropped onto the bottom do not hinder the regular run of the furnace. Furthermore, when a certain number of spacers will have accumulated on the bottom, they can be easily recovered by fishing them out with a simple curved iron. The Refrax spacers thus recovered can be re-employed. As soon as the tray, kept in lowered position by the first two operators, has been freed of the spacers by the third operator, the first two operators permit the tray to slowly come up until it adheres to the directly superjacent tray which in this way doubles its thickness i.e. returns to the initial thickness of 8 cm. As to the insertion of the new electrode, which has a thickness of 8 cm., the operation proceeds as already explained hereinbefore in the description of the invention.

One can also recover the spacers by lifting first the terminal anode and then the first tray which is in contact with said anode. In this way the subjecent tray which carries the spacers will float whereby the spacers are easily removed. Directly thereafter, the first tray is again lowered so as to put it in contact with the second one, and then operation is continued as already described.

It is evident that the electrolytic consumption of the half-tray, having 4 cm. thickness, in lower position, constitutes a remarkable advantage with respect to the case of the traditional multiple-anode furnaces. In fact, in the present case, a saving in anodic carbon consumption corresponding to about 10% is achieved.

The four electrode groups are connected in parallel to the electrical circuit of the furnace, each group being fed a current of 26,500:4=6625 amperes. The over-all anodic surface of the furnace amounts to 4×1 m.²=40,000 cm.². When carrying out the electrolysis at the traditional bath temperature, about 950° C., the tension at the furnace terminals varies between 6.4 and 6.6 volt. The furnace produces 13.7 kg. of aluminum/hour with a unit consumption of electrical energy equal to 12.8 kwh./kg. of aluminum. This is an energy saving corresponding to about 15% with respect to the traditional furnaces. The tapping of the produced aluminum takes place every 1½ days and is carried out by raising one of the four terminal cathode blocks and introducing the suction pipe of the vacuum tapping device of conventional type in its place. The quantity of aluminum drawn must be such that the level of aluminum present on the vat bottom lowers by 4 cm. The outspreading of the alumina which is periodically fed into the bath contained in the central alumina chamber and which, when dissolved, passes through the holes made in the side walls, entering the true electrolytic cells formed by the four electrodic groups, is to be considered as satisfactory. The area occupied by the herein exemplified furnace amounts to about 11 m.². The cost of this furnace is about 30-40% lower than the cost of a traditional type furnace having identical productive capacity.

I claim:

1. A fused bath electrolysis furnace for producing metals, of higher specific gravity than the bath, from their oxides, which comprises a vat with a cathodic bottom, a carbon anode adapted to be lifted and lowered relative to said bottom, and at least one horizontal bipolar carbon electrode between said anode and cathode in vertically spaced relation thereto and having a horizontal cathodic top face with upturned borders for accumulating metal produced, the length of said horizontal cathodic top face being substantially greater than the depth of said upturned borders.

2. An electrolysis furnace according to claim 1 for the production of aluminum from alumina in a bath containing fluorine salts, said horizontal bipolar carbon electrode being formed of pre-baked carbon.

3. A furnace according to claim 2, wherein the horizontal bipolar electrodes have a contour corresponding in shape to that of the base of the carbon anode, but of greater extension.

4. A furnace according to claim 2, wherein the horizontal bipolar electrodes are kept distanced from one another by means of special spacer members or elements, counterbalancing the upward thrust of the bath.

5. A furnace according to claim 4, wherein the horizontal bipolar electrodes have recesses on their lower face, apt to engage said spacing members or elements.

6. A furnace according to claim 4, wherein said spacers are bodies made of insulating refractory material selected from the group consisting of silicon carbide bonded with silicon nitride, and carbon.

7. A furnace according to claim 4, wherein the spacers, made of insulating refractory material, have frustoconical shape tapered towards the top, or pyramidal shape.

8. A furnace according to claim 5, wherein there is an annular hollow space for intercepting the electrolysis gases between the spacer and the recess with which it engages.

9. A furnace according to claim 4 wherein the spacers are of carbon and are composite, being made of a plurality of elements similar to one another, of substantially conical (frusto-conical), hollow shape, one superposed on the other, held merely by resting against the respective topside members or elements.

10. A furnace according to claim 9, wherein the elements have through-holes, said holes being in substantially vertical alignment.

11. A furnace according to claim 9, wherein said elements have peripheral through-notches, said notches being in substantially vertically aligned grooves.

12. A furnace according to claim 4, wherein each spacer consists of a portion of insulating refractory material forming the base of said spacer, and a portion of carbon forming the spacer head.

13. A furnace according to claim 2, wherein at least two electrolysis chambers are provided in a vat which is provided with protective lining at its side walls, each chamber comprising one or more piles of horizontal bipolar electrodes.

14. A furnace according to claim 13, wherein there is at least one chamber for feeding the starting metal oxide, interposed between the electrolysis chambers and communicating therewith by at least one hole, the bottom of said feeding chamber and its side walls being made of refractory material non-conductive of electrical current and resisting to the bath.

15. A furnace according to claim 13, wherein there is at least one chamber for tapping the fused metal, interposed between the electrolysis chambers and communicating therewith by at least one hole.

16. A furnace according to claim 14, wherein there is at least one chamber for the terminal cathodic electrode of carbonaceous material, from which departs a flexible metal conductor for connection to the cathodic current-carrying bar of the furnace itself, said chamber for the terminal cathodic electrode being partially filled with fused metal of the type produced in said furnace, through at least one hole communicating with said electrolysis chamber.

17. A furnace according to claim 16, wherein the chamber for the cathodic electrode is also the tapping chamber.

References Cited

UNITED STATES PATENTS

| 673,364 | 4/1901 | Hoopes | 204—67 |
| 1,030,490 | 6/1912 | Potter | 204—245X |
| 1,545,383 | 7/1925 | Ashcroft | 204—244 |
| 1,569,606 | 1/1926 | Ashcroft | 204—244X |
| 3,067,124 | 12/1962 | DePaua | 204—244 |

JOHN H. MACK, Primary Examiner

D. R. VALENTINE, Assistant Examiner

U.S. Cl. X.R.

204—225, 245, 286